United States Patent Office 3,580,867
Patented May 25, 1971

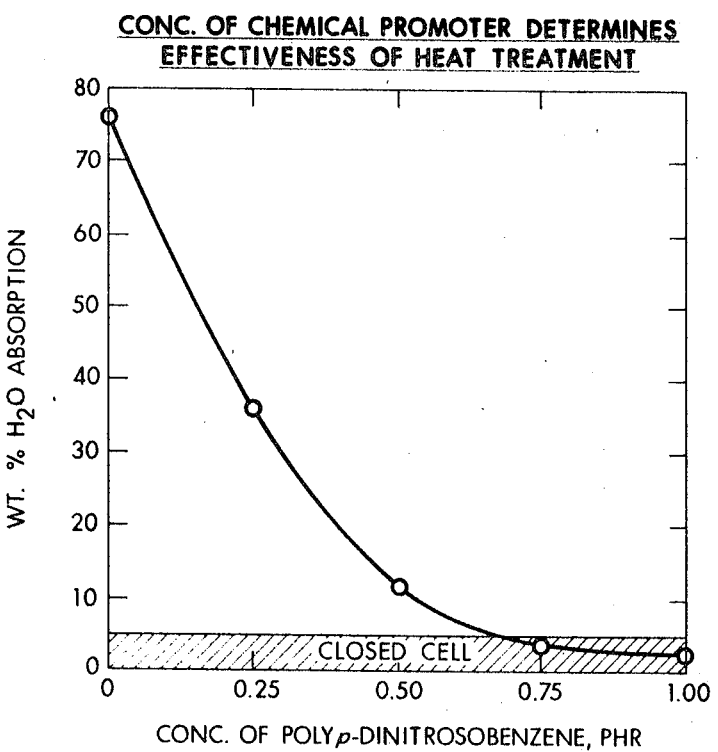

3,580,867
PROCESS FOR PREPARING A CLOSED CELL
EPDM SPONGE COMPOSITION
Lawrence Spenadel, Westfield, N.J., assignor to Esso
Research and Engineering Company
Filed Aug. 30, 1967, Ser. No. 664,493
Int. Cl. C08d 13/10, 9/16
U.S. Cl. 260—2.5          7 Claims

ABSTRACT OF THE DISCLOSURE

A compounded ethylene-propylene diene monomer (EPDM) suitable for use in manufacturing an improved closed cell sponge by the free expansion method and the process for preparing said compounded EPDM which comprises blending the EPDM with a reinforcing black and a chemical promoter and heat treating at an elevated temperature for a time sufficient to bond the EPDM to the reinforcing black, thereby increasing the tensile modulus of the EPDM.

BACKGROUND OF INVENTION

This invention relates to a novel EPDM composition suitable for producing a closed cell sponge of ethylene-propylene diene monomer (EPDM), and the process for making said composition. More specifically, it is directed to EPDM compositions which, when heat treated, produce an EPDM compound suitable for use in conventional sponge extrusion processes.

The term "sponge" as used throughout this specification means an expanded elastomer. The expanded elastomer is considered to be closed cell when it has a water absorption, as defined by ASTM D–1056 of less than 5 wt. percent.

Sponge elastomer is generally made by three methods: high pressure molding, low pressure molding and free expansion or extrusion process. Of these, the free expansion or extrusion process is usually the most economical since a high rate of throughput is possible and no expensive molds or high pressure equipment is required.

In the free expansion process the elastomer stock which contains the blowing agents and curatives is extruded and passed through a long curing tunnel or oven. In some cases a temperature gradient along the oven is used. When the sponge exits from the oven, it is in its finished size and shape and no post-cure or molding operation is required.

Since the stock as it passes through the air oven must expand and cure almost concurrently, a precise balance between rate of decomposition of blowing agent and rate of cure must be maintained. Any variation in stock composition, cure temperature, and cure time could upset this fine balance and cause underexpanded sponge. Furthermore, the elastomer to be expanded must have sufficient green strength in the uncured state to contain the pneumatogen (i.e. expanding gases) produced by decomposition of the blowing agent, e.g. nitrogen. Otherwise, the resulting product rather than being closed cell will have an open cell structure with poor surface and in extreme cases be collapsed to a high density.

It is difficult to prepare extruded closed cell sponge from elastomers having low unsaturation, such as ethylene propylene terpolymers (EPDM) or butyl rubber, by using standard type sulfur cures.

It is known that a butyl rubber sponge may be produced by using a rapid cure technique with quinoid type cure systems, e.g. see U.S. 3,010,916. As pointed out in that patent, however, the success of the method is critically dependent on the selection of butyl rubber as the elastomer as well as the selection of a particular combination of curatives for the butyl rubber together with the selection of a specific blowing agent.

It is known that it is possible to obtain a rapid cure of ethylene propylene terpolymers (EPDM) using a quinoid type system. Unfortunately, however, the use of a quinoid cure with EPDM creates a serious scorch problem which makes processing of sponge compounds in a rubber plant extremely difficult. On the other hand, if a standard sulfur cure is employed, the initial cure is too slow to retain the pneumatogen generated by the blowing agent. The result is a poorly blown sponge which has an open cell network, or in some cases expansion of the rubber compound is followed by sponge collapse resulting in a poor surface and high density.

SUMMARY OF INVENTION

It has now been found that, surprisingly, a vulcanizable EPDM compound, suitable for use in the making of sponge by the free expansion process may be prepared by heat treating EPDM and reinforcing black in the presence of certain chemical promoters. Thus, the EPDM and reinforcing black are heated at elevated temperatures in the presence of the chemical promoters for a sufficient time to bond the polymer to the carbon black, thereby increasing its tensile modulus.

The EPDM compound so formed may be stored as an intermediate for later use or may be immediately compounded with curatives and other additives, including blowing agents, extruded, and cured at a temperature to decompose the blowing agents, thereby forming a closed cell sponge. The intermediate itself may be stored for as long as several months without adversely effecting its suitability for sponge production.

It has also been found that a particular combination of heavy metal dialkyl dithiocarbamates used as a curative with certain cure activators and processing aids is particularly suited to the manufacturing of sponge from the compounded EPDM intermediate of this invention.

DETAILED DESCRIPTION

The term "EPDM" is used in the sense of its definition as found in ASTM D–1418–64 and is intended to mean a terpolymer containing ethylene and propylene in the backbone and a diene in the side chain. Illustrative methods for producing these terpolymers are found in U.S. Pat. 3,280,082 and British Pat. 1,030,989, which are incorporated herein by reference.

Any EPDM may be used in the practice of this invention. The preferred polymers contain about 50 to about 70 wt. percent ethylene and about 2.0 to about 5 wt. percent of a diene monomer, the balance of the polymer being propylene. Preferably, the polymer contains about 50 to about 60 wt. percent ethylene, e.g. 56 wt. percent, and about 2.6 to about 4.0 wt. percent diene monomer, e.g. 3.3 wt. percent.

The diene monomer is preferably a nonconjugated diene. Illustrative of these nonconjugated diene monomers which may be used in the terpolymer (EPDM) are hexadiene, dicyclopentadiene, ethylidene norbornene, methylene norbornene, propylidene norbornene and methyl tetrahydroindene. The particular diene used does not form a critical part of this invention and any EPDM fitting the above description may be used. A typical EPDM is Vistalon 4504 (Enjay Chemical Company) a polymer having a Mooney Viscosity at 212° F. of about 40, prepared from a monomer blend having an ethylene content of about 56 wt. percent and a nonconjugated diene content of about 3.3 wt. percent.

The chemical promoters of this invention may be divided into two classes—chemical compounds and chlorinated rubbers. The chemical compounds suitable for use as chemical promoters in this invention are dinitroso compounds, dioximes and similarly related compounds having an ortho or para quinoid aromatic nucleus or compounds which can be converted into such structure. Illustrative of the chemical compounds which may be used as chemical promoters are poly-p-dinitrosobenzene (Polyac), N-methyl-N,4-dinitrosoaniline (Elastopar), N-(2-methyl - 2 - nitropropyl) 4-nitrosoaniline (Nitrol), and p-quinone dioxime (GMF).

The second class of chemical promoters comprises metal oxide-vulcanizable, chlorine-containing rubbers. Illustrative of the chlorine-containing rubbers which may be used in the practice of this invention are chlorinated butyl rubber, chlorinated ethylene-propylene rubber, chlorinated EPDM, chlorine and sulfonyl chloride substituted polyethylene (e.g. Hypalon; see Introduction to Rubber Technology, ch. 14, Morton, Reinhold, 1959, incorporated herein by reference) and Neoprene rubber. Surprisingly not all neoprene rubbers are suitable for use as chemical promoters. There are two groups of general purpose neoprene—"G" types (neoprene GN, GNA and and GRT) and "W" types (neoprene W, WHV, WX, WRT, WD and WB). These rubbers are described in a text entitled The Neoprenes by Murray and Thompson; Du Pont, March 1963. The "G" types differ from the "W" types in that the former are interpolymerized with sulfur and contain thiuram disulfide, whereas the "W" type neoprenes contain no elemental sulfur, thiuram disulfide or other compound capable of decomposing to yield either free sulfur or a vulcanization accelerator. All of the "G" type neoprenes are suitable as chemical promoters, whereas the "W" type neoprenes are not suitable for this purpose.

Illustrative of the metal oxides suitable for vulcanizing the chlorine-containing rubbers are PbO and ZnO.

In the practice of this invention where the chemical promoter is a chemical compound, it is preferred that it is present at at least 0.7 phr. based on the EPDM; preferably about 0.7 phr. to about 2.0 phr.; most preferably about 0.8 to 1.0 phr. When the chlorine containing rubbers are used as chemical promoters, they are most advantageously used at about 5 to about 20 wt. percent, based on the EPDM plus chlorine containing rubber; preferably at about 8 to about 12 wt. percent, e.g. 10 wt. percent.

The expression "butyl rubber" as employed in the specification and claims is intended to include copolymers made from a polymerization reactant mixture having therein about 70–99.5% by weight of an isoolefin which has about 4–7 carbon atoms and about 30–0.5% by weight of a conjugated multiolefin having about 4–14 carbon atoms. The resulting copolymer contains 85–99.5% of combined isoolefin and about 0.5 to about 15% of combined multiolefin. The term "butyl rubber" is described in an article by R. M. Thomas et al. in Industrial Engineering and Chemistry, vol. 32, pp. 1283 et seq., October, 1940.

The butyl rubber generally has a Staudinger molecular weight between about 20,000 to about 500,000; preferably about 25,000 to about 200,000; especially 45,000 to 60,000; and a Wijs Iodine No. of about 0.5 to about 50; preferably 1 to 15. The preparation of butyl rubber is described in U.S. Pat. 2,356,128, which is incorporated herein by reference.

A typical method of chlorinating butyl rubber is to form a solution containing between about 1 to about 60% by weight of butyl rubber in an organic solvent such as hexane and to contact this butyl rubber cement with chlorine gas for a period of about 25 minutes whereby chlorinated butyl rubber and hydrogen chloride are formed, the copolymer containing up to 1 atom of chlorine per double bond in the copolymer. The preparation of chlorinated butyl rubbers is described in U.S. Pat. 3,099,644, which is incorporated herein by reference. This invention is not intended to be limited in any way by the manner in which the butyl rubber is chlorinated.

Illustrative of the chlorinated butyl rubbers which may be used in the practice of this invention is Enjay Butyl HT 1066, a chlorinated butyl rubber having a viscosity average molecular weight of about 350,000 to about 400,000, a mole percent unsaturation of about 1.1% to about 1.7% and a chlorine content of about 1.1 wt. percent to about 1.3 wt. percent.

Conventional blowing agents may be used in the practice of this invention. Preferably, the blowing agents have a decomposition temperature in air of about 100° C. to about 250° C. Typical of these blowing agents are the azo compounds, N-nitroso-compounds, and sulfonyl hydrazides. Illustrative of the azo compounds are azodicarbonamide (Kempore R–125, Celogen AZ), azobisisobutyronitrile, diazoaminobenzene, azocyclohexylnitrile, and the like. Illustrative of N-nitroso compounds are N,N' - dimethyl - N,N' - dinitrosoterephthalamide and N,N'-dinitrosopentamethylenetetramine. Illustrative of the sulfonyl hydrazides are benzenesulfonyl-hydrazide, benzene - 1,3-disulfonyl hydrazide, diphenylsulfonyl-3,3'-disulfonyl hydrazide and 4,4'-oxybis(benzene-sulfonyl)hydrazide.

Preferably, the blowing agent is used in a concentration of about 2 to about 15 phr. based on the EPDM; more preferably about 5 phr.

The reinforcing blacks suitable for use in this invention include the types designated SRF (ASTM No. N762), GPF (ASTM No. N660), HMF (ASTM No. N660), FEF (ASTM No. N550), HAF (ASTM No. N330) and EPC (ASTM No. S300). Preferably, FEF or SRF blacks are used.

The reinforcing black is preferably used at about 25 to about 150 phr. based on the EPDM; more preferably 50 to about 110 hpr., e.g. 100 phr.

In order to operate effectively the cure system used in the EPDM sponge compound must produce a rapid cure, i.e. within about 2 to about 10 minutes at about 350° F. to about 450° F. although sulfur cures are not generally rapid enough for producing sponge from an EPDM, it has been found that a suitable sulfur cure may be obtained by the use of certain heavy metal dialkyl dithiocarbamates in conjunction with a thiourea, a metal oxide and mercapto-benzothiazole as cure activators. Though the components of the cure system or their use in combination is not unique for the purpose of producing sponge, a proper balance must be maintained between the cure rate and the decomposition of the blowing agent. Any appreciable deviation from the preferred range of curative concentration will result in either an unexpanded material or an over-expanded collapsed sponge.

Typical of the metal oxide cure activators which may be used are ZnO, $PbO_2$ and MgO. Preferably the metal oxide cure activator is used at about 2.5 to about 10 phr., based on the rubber, more preferably about 4 to about 6 phr., e.g. 5 phr.

The heavy metal thiocarbamates usable in this invention have the general formula:

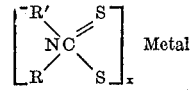

wherein R is an alkyl group having from 1 to 4 carbon atoms and preferably 1 to 2 carbon atoms; R' is an alkyl, aryl, alkaryl or cycloparaffin group having from 1 to 10 carbon atoms and is preferably an alkyl group having 1 to 4 carbon atoms; $x$ is the valence of the heavy metal and can be an integer of 2 to 4; the heavy metal is selected from those elements in groups I–B, II–B, IV–A, V–A, VI–A and VIII of the Periodic Chart of the Elements as published on pages 56 and 57 of the Handbook of Chemistry by Lange, 8th edition, 1952.

The dithiocarbamate salt may be a single salt or a mixture of salts, e.g. zinc dimethyl dithiocarbamate (Methyl Zimate) may be combined with tellurium diethyl dithiocarbamate (Tellurac). Other dithiocarbamates that are suitable for the purposes of this invention include selenium diethyl thiocarbamate, lead dimethyl dithiocarbamate, tellurium benzyl dithiocarbamate, zinc butyl dithiocarbamate, etc. For best results, the thiocarbamate portion of the blend should comprise either the zinc or tellurium salt alone or a combination of these salts.

The thiocarbamates are used in a range of about 1 to about 5 phr. based on the EPDM, preferably about 2 to about 5 phr. and most preferably about 3 to about 4 phr. Typically, mixtures of dithiocarbamates comprising about 0.5 to about 1.5 phr. of tellurium diethyl dithiocarbamate, e.g., 0.8 phr., may be used in conjunction with about 2 to about 4 phr., based on the EPDM, e.g. 3 phr., of zinc dimethyl dithiocarbamate.

Illustrative of the thioureas which may be used in the practice of this invention are thiocarbanilide (A-1), 1,3-diethylthiourea (Pennzone E), 1,3-dibutylthiourea (Pennzone B). Preferably, the thioureas are used in the range of about 1 to about 5 phr. based on the EPDM, more preferably about 2 to about 5 phr., e.g. 3 phr.

Mercaptobenzothiazole is also used as a cure activator. Typically, the mercaptobenzothiazole is used at about 0.5 to about 3 phr. based on the EPDM; preferably about 1 to about 2 phr., e.g. 1.5 phr.

Other additives which may advantageously be use in the practice of this invention are various conventional rubber processing aids and plasticizers such as paraffinic or naphthenic process oils, microcrystalline waxes, tributyl ethyl phosphate (KP 140), methyl hydroxy stearate (Paricin-1) and vulcanized vegetable oil such as that produced by the reaction of soya oil with sulfur monochloride (Factice 57–S). The term "microcrystalline wax" as used in this specification means petroleum derived waxes characterized by the fineness of their crystals in distinction to the larger crystals of paraffin wax.

The process oils are necessary for the production of suitable sponge and may be used in amounts ranging from about 10 to about 125 phr., preferably about 25 to about 100 phr., most preferably about 30 to about 60 phr., e.g. 50 phr. The other above mentioned process aids may each be used in amounts ranging from about 1 to about 20 phr., based on the EPDM; preferably about 1 to about 10 phr., most preferably about 2.5 to about 10 phr.

The microcrystalline waxes (e.g. Humble Mikrovan 1750, a microcrystalline wax melting at 175° F.) used in conjunction with Factice 57–S have been found to be particularly advantageous in improving processability of the compound EDPM when used in concentrations of about 5 to 35 phr., based on the EPDM. Preferably, the microcrystalline wax is used in concentrations of about 5 to about 20 phr. based on the EPDM, more preferably, about 5 to about 10 phr. The Factice 57–S is used in concentrations of about 5 to about 15 phr., based on the EPDM; more preferably, 5 to about 10 phr.

The blowing agents are known to be most effective when used in conjunction with various blowing aids such as fatty acids and urea. The fatty acids particularly suited for use as blowing aids are the $C_{12}$ to $C_{18}$ fatty acids such as stearic acid, oleic acid and lauric acid. These blowing aids are preferably used in amounts of about 1 to about 5 phr., based on the EPDM; more preferably about 1 to about 4 phr.; most preferably about 1.5 to about 3 phr., e.g. 2 phr.

It has been found that the use of certain blends of reinforcing mineral fillers in conjunction with the reinforcing black results in reduced sponge density while maintaining satisfactory sponge surface. In particular blends of natural coated oyster shell calcium carbonate (Laminar) with hydrated aluminum oxide (Snobrite Clay) or ultra fine magnesium silicate (Mistron Vapor Talc) have been found to be especially advantageous. These reinforcing mineral fillers are often used in 50/50 blends with the various black fillers. Preferably, the reinforcing mineral fillers are used at about 25 to about 125 phr. based on the EPDM, more preferably about 25 to about 75 phr., most preferably about 25 to about 50 phr.

Heat treatment consists of blending the EPDM, reinforcing black and chemical promoter for about 1 to about 10 minutes, preferably about 3 to about 5 minutes, e.g. 4 minutes, at a temperature of about 250° to about 350° F., preferably about 300° to about 330° F., e.g. 325° F. Blending may be accomplished in any suitable blender, e.g. Banbury mixer.

Preferably, the heat treating is done in the absence of processing aids. However, if desired, part or all of the processing aids may be added during heat treatment.

The vulcanizing curatives and blowing agents, however, cannot be added until after the heat treatment. Otherwise, a premature cure and decomposition of blowing agents will occur. Addition of these components must be done at a temperature insufficient to cure the EPDM or decompose the blowing agent.

The chemical promoter is an essential part of the heat treating process. Its deletion from this step results in ineffective heat treatment. Although some of the chemical promoters of this invention (e.g. p-quinone dioxime) are known to be curatives, they are ineffective for the purposes of this invention if combined with the vulcanization curatives rather than being utilized in the heat treating process.

The following examples illustrate how the processes of the invention may be carried out as well as the benefits derived from its use.

EXAMPLE 1

A series of EPDM compounds having the following formulation were prepared and designated blends A–E, the blends differing only in the chemical promoter used.

| Component: | Parts by weight |
|---|---|
| Vistalon 4504 (EPDM — Enjay Chemical Co.) | 100 |
| FEF Black | 100 |
| Flexon 845 [1] | 40 |
| Factice 57–S | 10 |
| Mikrovan Wax 1750 [2] | 10 |
| ZnO | 5 |
| Stearic acid | 2 |
| Heat treating agent (chemical promoter as shown in Table I) | 1 |
| Celogen AZ [3] | 3 |
| Sulfur | 3 |
| Mercaptobenzothiazole | 1.5 |
| Tellurac (80%) | 1 |
| Methyl Zimate | 3 |
| A–1 [4] | 3 |

[1] A paraffinic process oil having a viscosity of 43.8 SUS @ 210° F., a gravity of 32.4° API and a viscosity-gravity constant of 0.797 (Humble Oil & Refining Co.).
[2] Microcrystalline wax melting at 175° F. (Humble Oil & Refining Co.).
[3] Azodicarbonamide.
[4] Thiocarbanilide.

Blending was accomplished by adding the polymer, black and heat treating agent in a Banbury mixer and mixing until the temperature in the mixing chamber reached 320° F. The time required for such a heat build-up was about 2 to 4 minutes. The blend was then heat treated by continuing the mixing for an additional 4 minutes at 320–330° F. At the end of this heat treating step the process oil, Factice 57–S, Mikrovan Wax 1750 and stearic acid were added while chilled water was circulated around the outer wall of the mixing chamber. Mixing was carried out for an additional 2–10 minutes with continued cooling. After mixing, the compound was placed on a cool mill and the blowing agent and curative were added. The resulting compound was then extruded to the required configuration. The extrudate was passed through an air oven at about 400° F. for 5 minutes at which time curing and expansion of the elastomer composition took place. The results of these tests are shown in Table I.

TABLE I
[Effect of heat treating agents [1]]

| Compound | A | B | C | D | E |
|---|---|---|---|---|---|
| Heat treating agent | None | [2] Polyac | [3] Elastopar | [4] GMF | [5] GMF |
| Mooney plasticity at 212° F., 4 minute reading | 37.0 | 30.0 | 31.5 | 35.5 | 38.0 |
| Mooney Scorch at 250° F., minutes to 5 pt. rise above min | 3.4 | 4.2 | 4.2 | 3.6 | 4.9 |
| Physical properties, cured 5'/400° F. in air: | | | | | |
| Density, lbs./ft.$^2$ | 40.1 | 27.8 | 29.1 | 30.7 | 38.9 |
| Compression deflection, p.s.i.[6] | 11.2 | 5.9 | 5.6 | 6.6 | 13.8 |
| Compression set, percent [7] | 19.3 | 39.5 | 38.8 | 39.8 | 27.5 |
| Water absorption, percent [8] | 52.8 | 2.9 | 2.5 | 1.9 | 54.8 |

[1] Heat treatment: 4 min./320-330° F.
[2] Poly-p-dinitrosobenzene.
[3] N-methyl-N4-dinitrosoaniline.
[4] P-quinone dioxime.
[5] Compound was heat treated, 1 phr. GMF was added along with the cure not during heat treatment.
[6] ASTM Test D 1056-62T.
[7] ASTM Test D 1056-62T.
[8] ASTM Test D 1056-62T.

As is indicated by the data of Table I, heat treatment results in a closed cell sponge having a low density which produces a low compression deflection. Where no heat treating agent (chemical promoter) was used (compound A), the sponge formed had a high compression deflection due to a high density, and high water absorption, the latter indicating open cell structure. Similarly, where the chemical promoter (p-quinone dioxime) was added along *with the cure rather than during heat treating* compounds D and E) a poor product was obtained. Hence, it is demonstrated that using p-quinone dioxime as a curative rather than a heat treatment chemical promoter, results in an unsuitable sponge product. Conversely, heat treating resulted in a low density closed cell sponge having a low compression deflection and water absorption.

EXAMPLE 2

The formulation of Example 1-B was prepared in a manner identical to that of Example 1 using varying amounts of Polyac (poly-p-dinitrosobenzene) in order to determine the effect of the chemical promoter concentration on sponge formation. The results of these experiments are shown graphically in FIG. 1. Below about 0.7 phr., based on the EPDM, of chemical promoter an open cell sponge is formed.

EXAMPLE 3

Formulations were prepared in a manner identical to that of Example 1 using various neoprene rubbers as the heat treating agent (chemical promoter).

| Component: | Parts by weight |
|---|---|
| Vistalon 4504 (EPDM) | 90 |
| Neoprene (Type as shown in Table II) | 10 |
| FEF Black | 100 |
| Flexon 640 [1] | 50 |
| Factice 57-S [2] | 10 |
| Mikrovan 1750 [3] | 10 |
| ZnO | 5 |
| Sulfur | 2 |
| Stearic acid | 2 |
| Azodicarbonamide | 5 |
| A-1 [4] | 3 |
| Methyl zimate [5] | 3 |
| Tellurac [6] (80%) | 1 |
| Mercaptobenzothiazole | 1.5 |

[1] A naphthenic process oil having a viscosity of 40.3 SUS @ 210° F., a gravity of 23.0° API and a viscosity gravity constant of 0.867 (Humble Oil & Refining Co.).
[2] Reaction product of soya oil and sulfur monochloride.
[3] Microcrystalline wax having a melting point of 175° F. (Humble Oil & Refining Co.).
[4] Thiocarbanilide.
[5] Zinc dimethyl dithiocarbamate.
[6] Tellurium diethyl dithiocarbamate.

The heat treated compounded EPDM was extruded on a No. ½ Royle extruder at 60 r.p.m. using a cool barrel and a ¼ rod die maintained at 175° F. The results are shown in Table II.

TABLE II
[EPDM/polychloroprene extruded sponge]

| Compound | A | B | C | D |
|---|---|---|---|---|
| Neoprene type | GNA | GRT | GN | W |
| Mooney Scorch at 250° F., 5 pt. reading | 3.6 | 3.7 | 3.9 | 3.9 |
| Physical properties cured 5'/400° F. in air: | | | | |
| Azodicarbonamide, phr | 5 | 5 | 5 | 5 |
| Density, lbs./ft.$^3$ | 19.8 | 26.2 | 22.1 | 38.6 |
| Hardness, Shore "00" | 65 | 72 | 68 | 85 |
| Water absorption, wt. percent [1] | 5.0 | 0.5 | 2.2 | 78.5 |
| Compression set B, percent | | 66.8 | 63.6 | |
| Sponge surface | ([2]) | ([2]) | ([2]) | ([3]) |
| Extrusion, No. ½ Royle, ¼" rod 60 r.p.m., die 175° F., barrel cool: | | | | |
| Feed | ([2]) | ([2]) | ([2]) | ([2]) |
| Rate, in./min | 118 | 113 | 119 | 115 |
| Swell, gms./inch | 1.24 | 1.26 | 1.31 | 1.30 |

[1] Water absorption>5%=open cell sponge.
[2] Good.
[3] Poor.

It is noted that compounds A, B, C (Table II) using type "G" neoprenes as the chemical promoter in the heat treating process resulted in closed cell sponge having good surface, whereas compound D, using neoprene "W" as the chemical promoter, resulted in a high density open celled sponge having a poor surface.

EXAMPLE 4

Compositions were prepared in a manner identical to that of Example 1 using varying amounts of chlorinated butyl rubber (Butyl HT 1066) as the heat treating agent (chemical promoter).

| Component: | Parts by weight |
|---|---|
| Vistalon 4504 (EPDM) | As shown in Table III |
| Butyl HT 1066 | As shown in Table III |
| FEF Black | 100 |
| Mikrovan 1750 | 10 |
| Factice 57-S | 10 |
| Flexon 640 oil | 50 |
| ZnO | 5 |
| Stearic acid | 2 |
| Sulfur | 2 |
| A-1 | 3 |
| Methyl Zimate | 3 |
| Mercaptobenzothiazole | 1.5 |
| Tellurac (80%) | 1 |
| Azodicarbonamide | 5 |

The heat treated compounded EPDM was extruded in the manner of Example 1 to form sponge. The results of these tests are shown in Table III.

TABLE III
[EPDM/Butyl HT Extruded Sponge]

| Compound | A | B | C |
|---|---|---|---|
| Enjay Vistalon 4504 | 90 | 80 | 100 |
| Enjay Butyl HT 10-66 | 10 | 20 | |
| Mooney Scorch at 250° F., minutes to 5 pt. rise | 3.7 | 3.7 | 3.7 |
| Mooney plasticity at 212° F., 4 minute reading | 34 | 31 | 37 |
| Physical properties cured 5'/400° F. in air: | | | |
| Density, lbs./ft.³ | 20.0 | 19.7 | 36.4 |
| Hardness, Shore "00" | 67 | 66 | 80 |
| Compression set B, percent | 65.5 | 76.2 | |
| Water absorption, wt. percent | 4.2 | 5.0 | 121.0 |
| Sponge surface | (¹) | (²) | (³) |
| Extrusion behavior, No. ½ Royle, ¼" Rod, 60 r.p.m. die 175° F., barrel cool: | | | |
| Feed | Good | Good | Good |
| Rate, in./min | 121 | 130 | 119 |
| Swell, gms./in | 1.22 | 1.21 | 1.24 |

¹ Fair-Good. ² Fair. ³ Fair-Poor.

As indicated in Table III, heat treatment with chlorinated butyl rubber results in a closed cell sponge having low density (compounds A and B), whereas under the same conditions in the absence of the chemical promoter (compound C) a high density open celled sponge is formed.

Since many different embodiments of this invention may be made without departing from the spirit and the scope thereof, it is to be understood that the present invention is not limited to the embodiment specifically disclosed in this specification thereof.

What is claimed is:

1. A process for preparing a vulcanizable compounded EPDM suitable for use in producing sponge by the free expansion method which comprises:
   (a) blending in a mechanical mixer
      (1) a major amount of an EPDM,
      (2) about 25 to about 150 phr., based on the EPDM of a reinforcing black, and
      (3) a chemical promoter wherein the chemical promoter is (a) a chemical compound having an ortho or para quinoid aromatic nucleus present in a concentration of at least 0.7 phr., based on the EPDM or (b) a chlorine containing rubber selected from the group consisting of chlorinated butyl rubber and a polychloroprene composition comprising polychloroprene interpolymerized with sulfur and containing thiuram disulfide wherein said chlorine containing rubber is present at about 5 to about 20 wt. percent, based on the EPDM plus chlorine containing rubber;
   (b) heat treating the resulting EPDM blend by mixing in a mechanical mixer for about 1 to about 10 minutes at about 250° F. to about 350° F.;
   (c) blending into said heat treated EPDM, while cooling the mechanical mixer
      (1) about 10 to about 125 phr., based on the EPDM of a processing oil selected from the group consisting of paraffinic process oils and napthenic process oils,
      (2) about 5 to about 35 phr., based on the EPDM of a processing aid selected from the group consisting of microcrystalline waxes, tributyl ethylphosphate, methyl hydroxyl stearate, a vulcanized vegetable oil which is the reaction product of soya oil with sulfur monochloride and mixtures thereof, and
      (3) about 1 phr., based on the EPDM of stearic acid;
   (d) transferring the resulting blend to a cool mill and compounding said blend with
      (1) a blowing agent selected from the group consisting of azo compounds, N-nitroso compounds and sulfonyl hydrazides which decompose in air at a temperature of about 100° C. to about 250° C.,
      (2) a vulcanizing amount of sulfur,
      (3) about 1 to about 5 phr. based on the EDPM of a heavy metal dialkyl dithiocarbamate wherein the heavy metal is selected from the group consisting of tellurium, zinc, lead, tin, cadmium, nickel, selenium, copper and bismuth and mixtures thereof,
      (4) an activating amount of a metal oxide cure activator,
      (5) an activating amount of mercaptobenzothiazole, and
      (6) about 1 to about 5 phr., based on the EPDM, of a thiourea selected from the group consisting of thiocarbanilide, diethylthiourea, and dibutylthiourea.

2. The process of claim 1 wherein the chemical compound is N-methyl-N-4-dinitrosoaniline, poly-p-dinitrosobenzene, N-(2-methyl-2-nitrosopropyl) 4-nitrosoaniline and p-quinone dioxime.

3. The process of claim 1 wherein the chemical promoter is a chlorine containing rubber selected from the group consisting of chlorinated butyl rubber and a polychloroprene composition comprising polychloroprene interpolymerized with sulfur and containing thiuram disulfide.

4. The product of claim 1.

5. An EPDM sponge prepared from the product of claim 1.

6. The process of claim 3 wherein
   (a) the reinforcing black is present at about 100 phr., based on the EPDM plus chlorine containing rubber;
   (b) the chlorine containing rubber is present at about 10 wt. percent based on the EPDM plus chlorine containing rubber;
   (c) the processing oil is present at about 50 phr., based on the EPDM plus chlorine containing rubber;
   (d) the processing aid is a mixture of about 10 phr., based on the EPDM plus chlorine containing rubber, of the vulcanized vegetable oil and about 10 phr., based on the EPDM plus chlorine containing rubber, of a microcrystalline wax;
   (e) the blowing agent is azodicarbonamide present at about 5 phr., based on the EPDM plus chlorine containing rubber;
   (f) the heavy metal dithiocarbamate is a mixture comprising about 3 phr., based on the EPDM plus chlorine containing rubber, of zinc dimethyl dithiocarbamate and about 0.8 phr., based on the EPDM plus chlorine containing rubber, of tellurium diethyl dithiocarbamate;
   (g) the metal oxide cure activator is ZnO present at about 5 phr. based on the EPDM plus chlorine containing rubber;
   (h) the mercaptobenzothiazole is present at about 1.5 phr., based on the EPDM plus chlorine containing rubber; and
   (i) the thiourea is thiocarbanilide present at about 3 phr., based on the EPDM plus chlorine containing rubber.

7. The process of claim 6 wherein the chlorine containing rubber is chlorinated butyl rubber.

References Cited
UNITED STATES PATENTS
3,296,183   1/1967   Schoenbeck   260—889
3,298,970   1/1967   Stare et al.   260—2.5

OTHER REFERENCES
Nordel, a technical report, E. I. du Pont de Nemours and Company, Inc., April 1964, pp. 19, 22, 70 and 71.

MURRAY TILLMAN, Primary Examiner

W. J. BRIGGS, SR., Assistant Examiner

U.S. Cl. X.R.

260—23.7, 28.5, 33.6, 41.5, 79.5, 80.78, 889, 890, 896, 897